United States Patent
Kudo

(10) Patent No.: US 9,277,114 B2
(45) Date of Patent: Mar. 1, 2016

(54) IMAGE PICKUP APPARATUS TO WHICH A LENS UNIT WITH A FOCUS LENS IS ATTACHABLE AND CAPABLE OF PERFORMING ACCURATE AND FAST FOCUS DETECTION, METHOD OF CONTROLLING IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventor: Keisuke Kudo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/273,326

(22) Filed: May 8, 2014

(65) Prior Publication Data

US 2014/0340562 A1 Nov. 20, 2014

(30) Foreign Application Priority Data

May 20, 2013 (JP) ................................. 2013-106387

(51) Int. Cl.
*G03B 13/00* (2006.01)
*H04N 5/232* (2006.01)
(Continued)

(52) U.S. Cl.
CPC .............. *H04N 5/23212* (2013.01); *G02B 7/28* (2013.01); *G02B 7/36* (2013.01); *G02B 7/38* (2013.01); *H04N 5/23209* (2013.01); *G02B 7/102* (2013.01)

(58) Field of Classification Search
USPC .......................... 348/345, 349, 350, 353–356
See application file for complete search history.

(56) References Cited

U.S. PATENT DOCUMENTS 8,629,933 B2 * 1/2014 Okamoto ............... G02B 7/102
348/222.1
8,836,843 B2 * 9/2014 Yasuda .................... G03B 3/10
348/221.1
(Continued)

FOREIGN PATENT DOCUMENTS

JP 07-007650 A 1/1995
JP 08-029667 A 2/1996
(Continued)

OTHER PUBLICATIONS

The above foreign patent documents were cited in the Sep. 15, 2015 Japanese Office Action, which is enclosed without an English Translation, that issued in Japanese Patent Application No. 2013-106387.

*Primary Examiner* — Ngoc-Yen Vu
(74) *Attorney, Agent, or Firm* — Cowan, Liebowitz & Latman, P.C.

(57) ABSTRACT

An image pickup apparatus where a lens unit including an image pickup optical system including a focus lens is attachable, includes an image pickup element, a control unit that controls drive of the focus lens based on a focus signal, and an acquisition unit that acquires type information of the lens unit, and the control unit performs a first scanning operation of driving the focus lens in a first direction and perform a second scanning operation of driving the focus lens at a lower speed than a predetermined speed in a second direction after the first scanning operation, and determines whether to perform the second scanning operation based on the type information in a case where a drive speed of the focus lens when an in-focus position is detected based on the focus signal acquired during the first scanning operation is higher than the predetermined speed.

14 Claims, 12 Drawing Sheets

(51) Int. Cl.
  *G02B 7/28* (2006.01)
  *G02B 7/38* (2006.01)
  *G02B 7/36* (2006.01)
  H04N 5/225 (2006.01)
  G02B 7/10 (2006.01)

(56) References Cited

U.S. PATENT DOCUMENTS

2008/0198257 A1* 8/2008 Morimoto ............... 348/345
2012/0169917 A1* 7/2012 Isobe ....................... 348/345
2013/0010179 A1* 1/2013 Takahara et al. ........ 348/353
2014/0092269 A1* 4/2014 Okamoto ............ G02B 7/102
  348/220.1
2014/0327810 A1* 11/2014 Kikuchi ............... G02B 7/36
  348/352

FOREIGN PATENT DOCUMENTS

| JP | 2007-071988 A | 3/2007 |
| JP | 2008-009341 A | 1/2008 |
| JP | 2012-137675 A | 7/2012 |
| JP | 2012-255919 A | 12/2012 |
| JP | 2013-011761 A | 1/2013 |
| JP | 2013-088785 A | 5/2013 |

* cited by examiner (i) SPD_CUR = HIGH SPEED (ii) SPD_CUR = MEDIUM SPEED (iii) SPD_CUR = LOW SPEED (i) FOCUS POSITION IS LARGER THAN 1m (ii) FOCUS POSITION IS EQUAL TO OR SMALLER THAN 1m

IMAGE PICKUP APPARATUS TO WHICH A LENS UNIT WITH A FOCUS LENS IS ATTACHABLE AND CAPABLE OF PERFORMING ACCURATE AND FAST FOCUS DETECTION, METHOD OF CONTROLLING IMAGE PICKUP APPARATUS, AND NON-TRANSITORY COMPUTER-READABLE STORAGE MEDIUM

BACKGROUND OF THE INVENTION

1. Field of the Invention

The present invention relates to an image pickup apparatus that drives a focus lens to perform focus detection.

2. Description of the Related Art

A contrast autofocusing (AF) method has been conventionally known as a method of moving the position of a focus lens in an image pickup apparatus such as a digital still camera to focus on an object. The contrast AF method generates a focus evaluation value corresponding to the contrast of an image using an image signal from the image pickup element. The method performs an automatic focusing operation that acquires the focus evaluation value while moving the position of the focus lens to find an in-focus position that is the focus lens position at which the focus evaluation value reaches a peak.

In the contrast AF method, a focus speed needs to be set such that a sufficient number of the focus evaluation values for the peak determination are acquired when the focus lens is in the vicinity of the in-focus position. In contrast at a position distant from the in-focus position, the focus lens is moved fast to achieve a fast AF operation. For this, it is known that the focus speed is varied based on the focus evaluation value while the focus lens is driven. Japanese Patent Laid-open No. H7-7650 discloses an automatic focus video camera that calculates the rate of change in the evaluation value that is the ratio between the amount of change in the focus evaluation value and the amount of change in the lens position, and the video camera varies the change speed of the lens position depending on whether the rate of change in the evaluation value is increasing or decreasing. Japanese Patent Laid-open No. H8-29667 discloses an automatic focusing method of predicting the in-focus position (the peak position) based on the focus evaluation value and, in a case of a distant predicted in-focus position, moving the lens fast before setting a low speed.

When a velocity control is performed after determination that the focus lens is in the vicinity of the in-focus position of an object, however, such an AF method that acquires the focus evaluation value while driving the focus lens generates a time lag from the determination to the velocity control. The shape of the focus evaluation value varies with the contrast of the object, frequency, and settings of a stop, exposure, and the like. For this reason, when the peak position of the object is determined based on the shape of the focus evaluation value, the velocity is potentially unable to decrease to a predetermined velocity that allows a sampling interval ensuring an AF accuracy before the focus lens reaches the vicinity of the in-focus position. To solve this, it is suggested to perform scanning again (rescanning) when the focus lens fails to sufficiently slow down in the vicinity of the in-focus position, but the rescanning results in a longer time for focusing.

The configurations disclosed in Japanese Patent Laid-open No. H7-7650 and Japanese Patent Laid-open No. H8-29667 are not based on consideration of the time lag from the determination of the shape of the focus evaluation value to the velocity control.

SUMMARY OF THE INVENTION

The present invention enables a more highly accurate and fast focus detection when AF is performed by acquiring the focus evaluation value while driving the focus lens.

An image pickup apparatus as one aspect of the present invention is an image pickup apparatus to which a lens unit including an image pickup optical system including a focus lens is attachable, the image pickup apparatus includes an image pickup element configured to perform photoelectric conversion on light passing through the image pickup optical system of the attached lens unit to generate an image pickup signal, a control unit configured to control drive of the focus lens based on a focus signal generated from the image pickup signal, and an acquisition unit configured to acquire type information of the lens unit, and the control unit is configured to perform a first scanning operation of driving the focus lens in a first direction and perform a second scanning operation of driving the focus lens at a lower speed than a predetermined speed in a second direction different from the first direction after the first scanning operation, and determine whether to perform the second scanning operation based on the type information of the lens unit in a case where a drive speed of the focus lens when an in-focus position is detected based on the focus signal acquired during the first scanning operation is higher than the predetermined speed.

An image pickup apparatus as another aspect of the present invention is an image pickup apparatus to which a lens unit including an image pickup optical system including a focus lens is attachable, the image pickup apparatus includes an image pickup element configured to perform photoelectric conversion on light passing through the image pickup optical system of the attached lens unit to generate an image pickup signal, a control unit configured to control drive of the focus lens based on a focus signal generated from the image pickup signal, and an acquisition unit configured to acquire an upper limit speed of the focus lens, and the control unit is configured to perform a first scanning operation of driving the focus lens in a first direction and perform a second scanning operation of driving the focus lens at a lower speed than a predetermined speed in a second direction different from the first direction after the first scanning operation, and determine whether to perform the second scanning operation based on the upper limit speed of the focus lens in a case where a drive speed of the focus lens when an in-focus position is detected based on the focus signal acquired during the first scanning operation is higher than the predetermined speed.

A method of controlling an image pickup apparatus as another aspect of the present invention is a method of controlling an image pickup apparatus to which a lens unit including an image pickup optical system including a focus lens is attachable, the image pickup apparatus includes an image pickup unit configured to perform photoelectric conversion on light passing through the image pickup optical system to generate an image pickup signal, the method includes the steps of performing a first scanning operation of driving the focus lens in a first direction, performing a second scanning operation of driving the focus lens at a lower speed than a predetermined speed in a second direction different from the first direction after the first scanning operation, controlling drive of the focus lens based on a focus signal generated from the image pickup signal, and acquiring type information of the lens unit, and, in a case where a drive speed of the focus lens when an in-focus position is detected based on the focus signal acquired during the first scanning operation is higher than the predetermined speed, it is determined based on the type information of the lens unit whether the second scanning operation is to be performed.

A storage medium as another aspect of the present invention stores a computer program configured to cause a computer to execute the method of controlling the image pickup apparatus.

Further features and aspects of the present invention will become apparent from the following description of exemplary embodiments with reference to the attached drawings.

DESCRIPTION OF THE EMBODIMENTS

Figure 1:
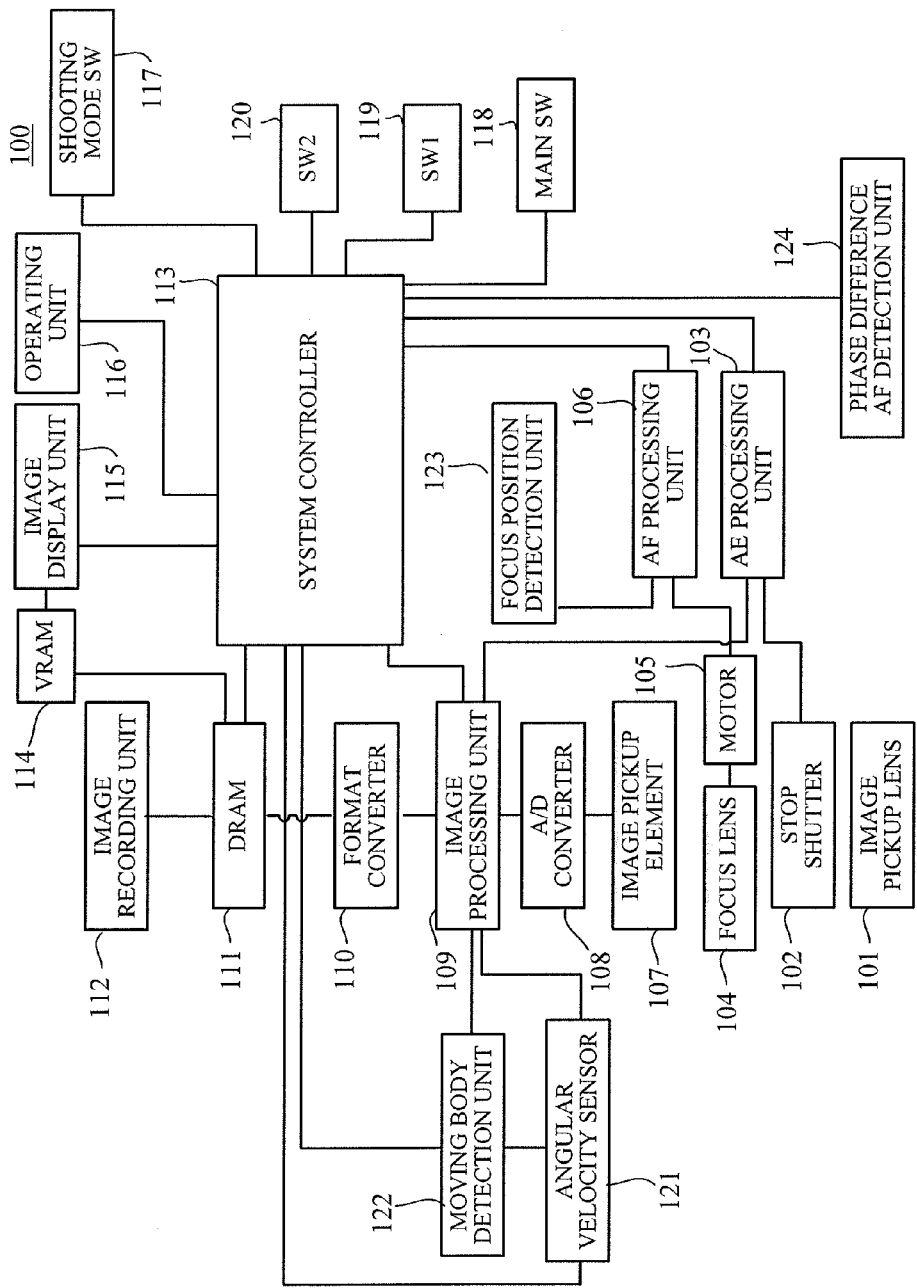
FIG. 1 is a block diagram illustrating the configuration of an image pickup apparatus in each of embodiments.

Exemplary embodiments of the present invention will be described below with reference to the accompanied drawings. In the drawings, the same elements have the same reference numeral, and their duplicate descriptions are omitted.

First Embodiment

First, referring to FIG. 1, the configuration of an image pickup apparatus in a first embodiment of the present invention will be described. FIG. 1 is a block diagram illustrating the configuration of an image pickup apparatus 100 (electronic camera) in the present embodiment.

In FIG. 1, an image pickup lens 101 includes a lens unit including a zoom mechanism. A stop shutter (stop and shutter) 102 controls light intensity. An AE processing unit 103 performs AE (automatic exposure) processing. A focus lens 104 is used for focusing on an image pickup element 107 to be described later. An image pickup optical system includes the image pickup lens 101, the stop shutter 102, and the focus lens 104. A motor 105 drives the focus lens 104. An AF processing unit 106 performs AF (automatic focus) processing. In the present embodiment, the image pickup apparatus 100 integrally includes a lens barrel (lens apparatus including the image pickup lens 101, the stop shutter 102, the focus lens 104, and the motor 105) and an image pickup apparatus body, but is not limited to this configuration. The present embodiment is also applicable to an image pickup system including an image pickup apparatus body and a lens apparatus (interchangeable lens) detachable to the image pickup apparatus main body.

The image pickup element 107 includes a light receiving element such as a CCD sensor or a CMOS sensor and is a photoelectric conversion element that photoelectrically converts an object image (optical image) formed via the image pickup optical system including the focus lens 104 into an electric signal (analog signal). An A/D converter 108 converts the analog signal output from image pickup element 107 into a digital signal. The A/D converter 108 includes a CDS circuit for removing an output noise of the image pickup element 107 and a nonlinear amplifier circuit to be executed before the A/D conversion. An image processing unit 109 performs various kinds of image processing on the image signal converted to the digital signal. Reference numeral 110 denotes a format converter. A DRAM 11 that is a fast built-in memory is used as a temporal image storage unit (fast buffer) or a working memory for image compression or expansion. An image recording unit 112 includes a recording medium such as a memory card, and its interface.

A system controller 113 as a control unit such as a CPU controls the entire system of the image pickup apparatus 100 in a shooting sequence, for example. Reference numeral 114 denotes a VRAM (image display memory). An image display unit 115 performs image display, operation aid display, display of the state of the image pickup apparatus 100, and display of a shooting screen and a ranging region at shooting.

An operating unit 116 to be operated by a user includes a menu switch to perform various settings such as settings of a shooting function and image playback of the image pickup apparatus 100, a zoom lever to command a zoom operation of the image pickup lens 101, and an operation mode switch to switch between a shooting mode and a playback mode. A shooting mode SW (shooting mode switch) 117 is a switch for selecting a shooting mode such as a macro mode, a distant view mode, a sport mode, or the like. When a shooting mode is selected through the shooting mode SW 117 by the user, the system controller 113 changes, for example, a ranging distance range, an AF operation, or the like according to the selected shooting mode. A main SW (main switch) 118 is a switch for supplying power to the system of the image pickup apparatus 100. A switch 119 (SW1) is a switch for performing shooting standby operations such as AF, AE, and the like. A shooting switch (SW2) 120 is a switch for performing the shooting after the operations through the switch 119 (SW1). An angular velocity sensor 121 detects the movement of the image pickup apparatus 100 due to shake, panning, or the like. A moving body detection unit 122 detects a moving body (object) based on luminance information in a screen.

A focus position detection unit 123 detects the position (the current focus position) of the focus lens 104 and outputs that information to the AF processing unit 106. A phase difference AF detection unit 124 performs focus detection by a phase difference method and calculates the amount of defocus.

In the present embodiment, the image pickup apparatus 100 functions as an automatic focusing apparatus that calculates a focus evaluation value based on an image signal obtained through the image pickup optical system including the focus lens 104 and through the image pickup element 107, and controls the position of the focus lens 104. In other words, the AF processing unit 106 and the system controller 113 (the control unit) calculates a focus evaluation value based on an output signal of the image pickup element 107, and performs a drive control of the focus lens 104 based on the focus evaluation value.

Figure 2:
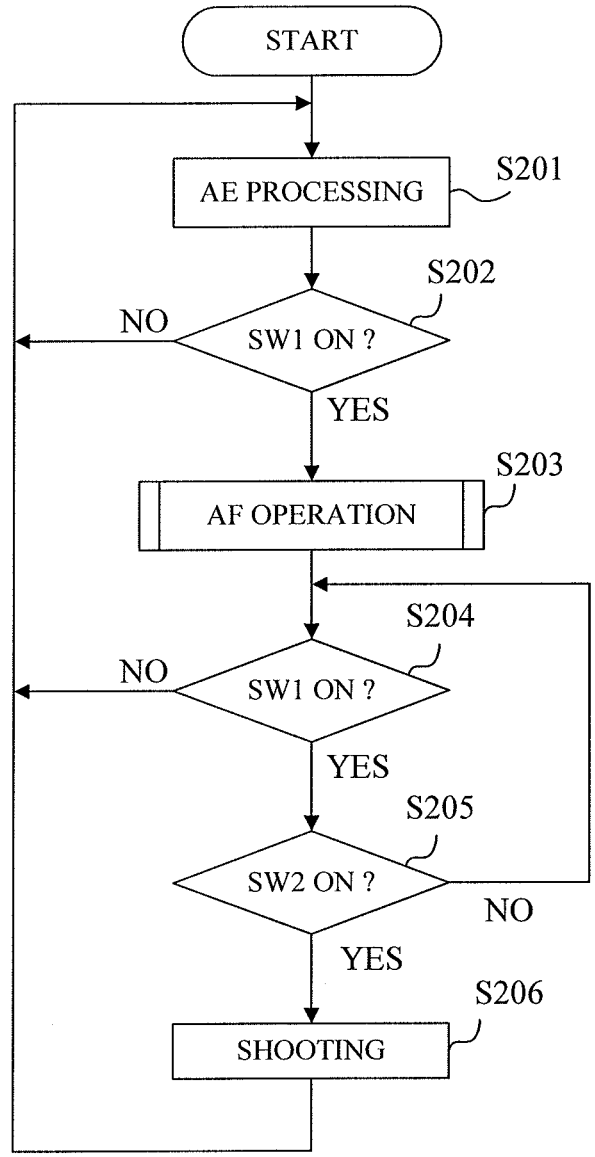
FIG. 2 is a flowchart illustrating an operation of the image pickup apparatus in each of the embodiments.

Next, referring to FIG. 2, an operation of the image pickup apparatus 100 (a method of controlling the image pickup apparatus 100) in the present embodiment will be described. FIG. 2 is a flowchart illustrating the operation of the image pickup apparatus 100 (the method of controlling the image pickup apparatus 100). The steps in FIG. 2 are each performed mainly based on a command (an instruction) from the system controller 113.

First at step S201, the AE processing unit 103 performs the AE processing with an output signal from the image processing unit 109. Subsequently, at step S202, the system controller 113 determines the state of the switch 119 (SW1). When the switch 119 (SW1) is off, the process returns to step S201 and repeats the AE processing. On the other hand, when the switch 119 (SW1) is on, the flow proceeds to step S203.

At step S203, the AF processing unit 106 performs an AF operation (focus detection processing). Exposure conditions (shutter speed, stop, and sensitivity) during the AE operation are determined by the AE processing at the foregoing step S201. The AF operation is described in detail later. Subsequently, at step S204, the system controller 113 determines the state of the switch 119 (SW1). When the switch 119 (SW1) is off, the process returns to step S201 and repeats the AE processing. On the other hand, when the switch 119 (SW1) is on, the flow proceeds to step S205.

At step S205, the system controller 113 determines the state of the switch 120 (SW2). When the switch 120 (SW2) is off, the process returns to step S204 and repeats the determination whether the switch 119 (SW1) is on. On the other hand, when the switch 120 (SW2) is on, the flow proceeds to step S206. At step S206, the system controller 113 performs shooting (a shooting operation) and the process returns to step S201.

Figure 3:
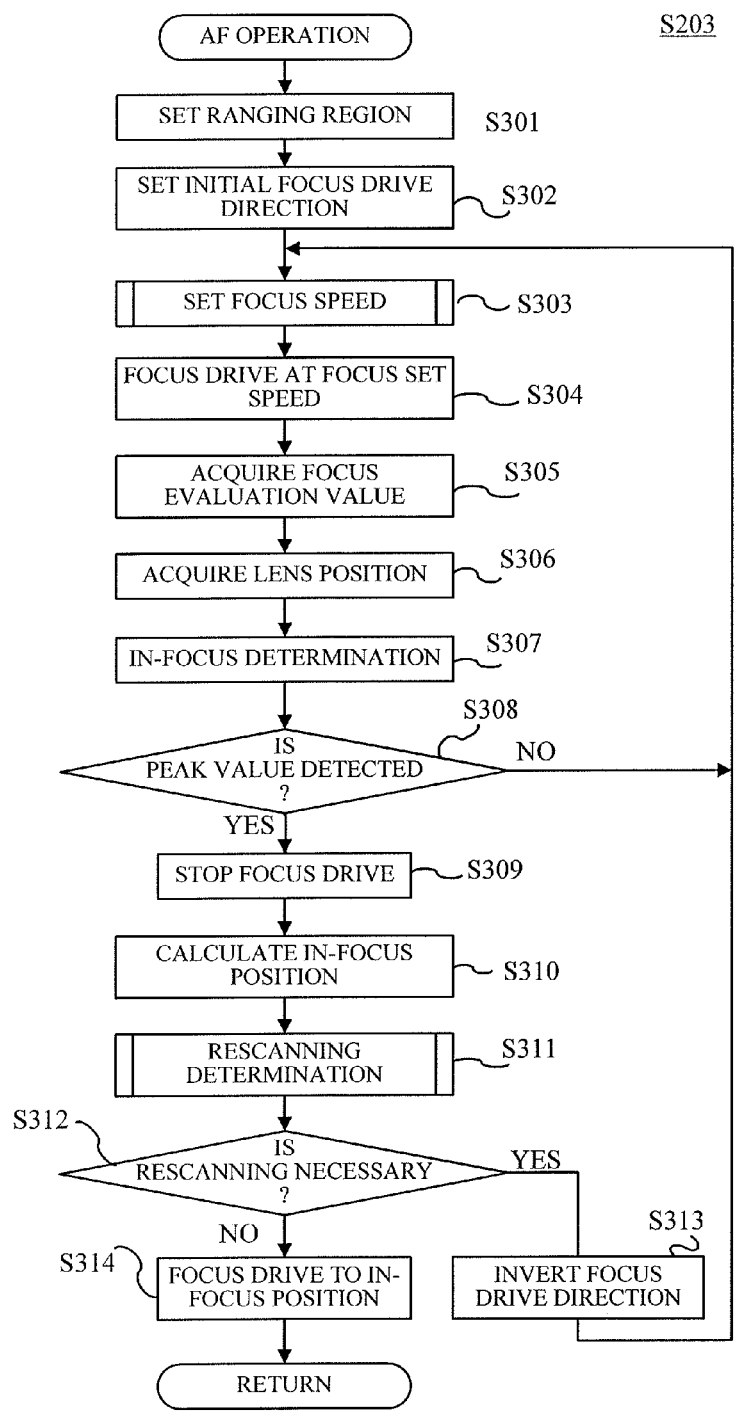
FIG. 3 is a flowchart illustrating an AF operation in each of the embodiments.

Next, referring to FIG. 3, the AF operation (step S203 in FIG. 2) in the present embodiment will be described in detail. FIG. 3 is a flowchart illustrating the AF operation. The steps in FIG. 3 are each performed mainly by the system controller 113, the AF processing unit 106, or the focus position detection unit 123.

First at step S301, the system controller 113 sets a ranging region (a focus detection region) in a predetermined region within a screen. Subsequently, at step S302, the system controller 113 sets an initial focus drive direction. The initial focus drive direction is, for example, a direction in which an object is likely to exist, or a direction toward the far end or the near end, which is closer to the current position of the focus lens 104. Subsequently, at step S303, the system controller 113 sets a focus speed. The setting of the focus speed will be described later.

Subsequently, at step S304, the AF processing unit 106 drives the focus lens 104 at the focus speed set at step S303. Specifically, the AF processing unit 106 controls the motor 105 so that the focus lens 104 is driven at the focus speed set at step S303.

Subsequently, at step S305, the system controller 113 acquires a focus evaluation value (a contrast evaluation value) within the ranging region set at step S301. The focus evaluation value is a focus evaluation value updated through a focus drive. Subsequently, at step S306, the focus position detection unit 123 acquires the current position of the focus lens 104. Subsequently, at step S307, the system controller 113 performs an in-focus determination. Specifically, the system controller 113 calculates a peak value of the focus evaluation value based on the focus evaluation value calculated using the output signal of the image pickup element 107 and the position of the focus lens 104.

At step S308, as a result of the in-focus determination at step S307, when it is not determined that the in-focus state is achieved (the peak value of the focus evaluation value is not detected), the flow returns to step S303 and repeats steps S303 to S308. On the other hand, when it is determined that the in-focus state is achieved (the peak value of the focus evaluation value is detected), the flow proceeds to step S309.

A series of operations at steps S303 to S308 are performed in a time period for one frame at the current frame rate. The focus evaluation value acquired at step S305 and the position of the focus lens 104 acquired at step S306 are associated with each other and used in an in-focus position calculation (calculation of the peak position of the focus evaluation value) at step S310 to be described later. In this case, the focus lens 104 is driven during acquisition of the focus evaluation value. Therefore, the position of the focus lens is calculated at the middle of an exposure time and is associated with the focus evaluation value.

Subsequently, at step S309, the AF processing unit 106 (the system controller 113) stops the drive of the focus lens 104. Then, at step S310, the AF processing unit 106 (the system controller 113) calculates the peak position (the in-focus position) of the focus evaluation value using the focus evaluation value acquired at step S305 and the position of the focus lens 104 corresponding to the focus evaluation value. The position of the focus lens 104 corresponding to the focus evaluation value is the focus lens position acquired at step S306.

Subsequently, at step S311, the system controller 113 performs a rescanning determination to determine conditions for performing scanning again (rescanning). The details of the rescanning determination will be described later. Then, at step S312, as a result of the rescanning determination at step S311, when it is determined that the rescanning is necessary, the flow proceeds to step S313. At step S313, the system controller 113 inverts the drive direction (the focus drive direction) of the focus lens 104, and the flow returns to step S303 and repeats the processing described above. On the other hand, when it is determined at step S312 that the rescanning is unnecessary, the flow proceeds to step S314. At step S314, the focus lens 104 is driven toward the peak position (the in-focus position) of the focus evaluation value calculated at step S310. This finishes the AF operation illustrated in FIG. 3.

(Setting of the Focus Speed)

Figure 4:
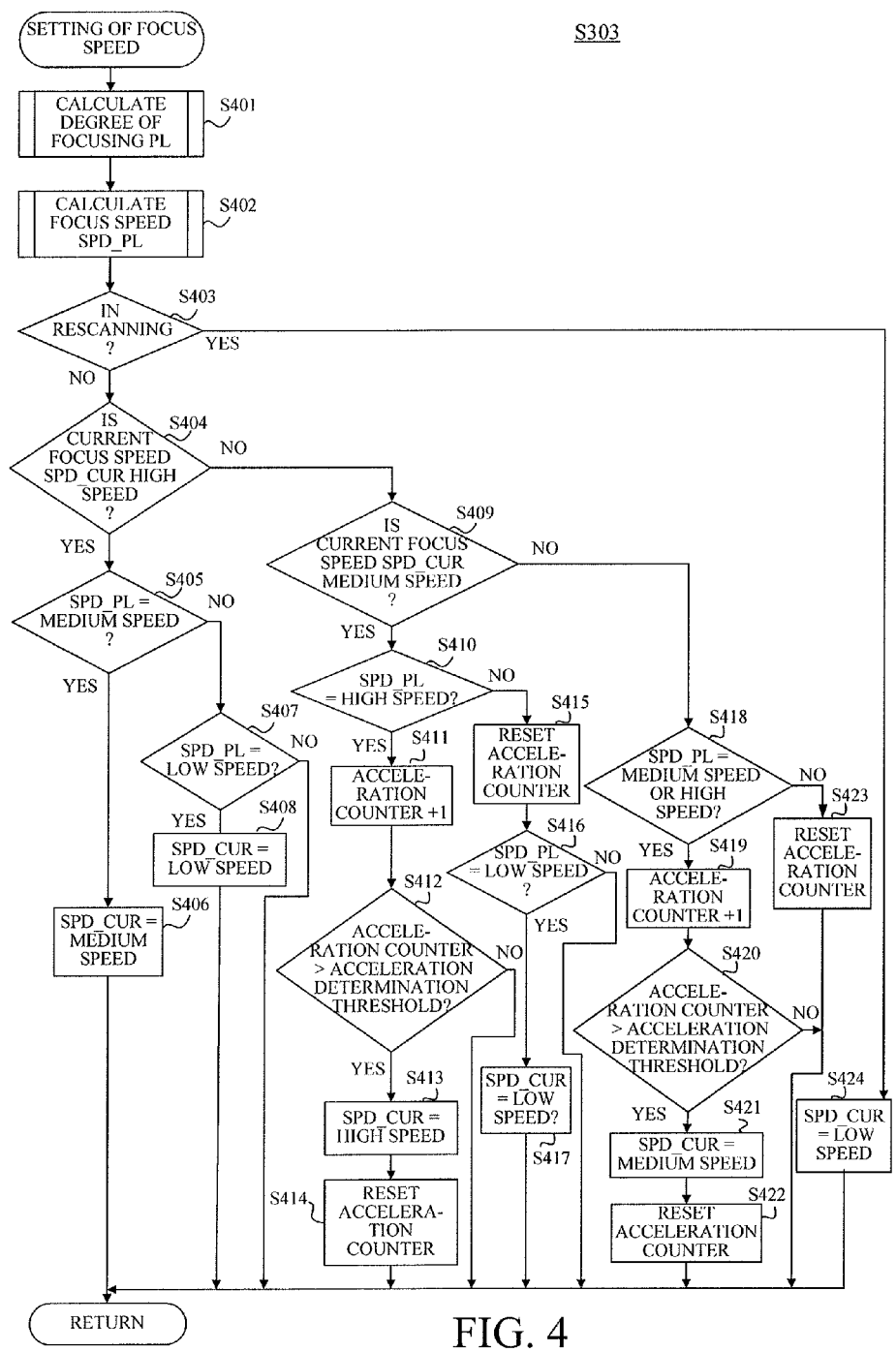
FIG. 4 is a flowchart illustrating a method of setting a focus speed SPD_CUR in each of the first, the second, and the fourth embodiments.

Next, referring to FIG. 4, the setting of the focus speed at step S303 in FIG. 3 will be described in detail. FIG. 4 is a flowchart illustrating the setting of the focus speed. The steps in FIG. 4 are each performed mainly by the system controller 113 and the AF processing unit 106.

First at step S401, the system controller 113 (the AF processing unit 106) calculates a degree of focusing PL. The degree of focusing PL is an index for determining a degree of blur of an object. When the degree of focusing PL is small, the system controller 113 determines that an amount of blur is large. On the other hand, when the degree of focusing PL is large, the system controller 113 determines that the focus lens 104 is located in the vicinity of the in-focus position. The calculation of the degree of focusing PL will be described in detail later.

Subsequently, at step S402, the system controller 113 calculates a focus speed SPD_PL depending on the degree of focusing PL calculated at step S401. The system controller 113 sets the focus speed SPD_PL depending on the degree of focusing PL, to drive the focus lens fast when determining that the amount of blur is large. Upon determining that the focus lens is located in the vicinity of the in-focus position, the system controller 113 drives the focus lens slowly. This allows an accurate and fast AF. In the present embodiment, the focus speed SPD_PL is set to the three speeds of low speed, medium speed, and high speed. The low speed is a speed at which an in-focus accuracy with a fine sampling interval is maintainable. The medium speed and the high speed are speeds at which the in-focus accuracy may not be maintainable. The present embodiment is, however, not limited to this configuration and may have a plurality of speeds other than the three speeds.

Subsequently, at step S403, the system controller 113 determines whether the current AF state (a focus detection state) is in rescanning. When the current AF state is in rescanning, the flow proceeds to step S424. At step S424 (in rescanning), the system controller 113 sets a current focus speed SPD_CUR to the low speed.

On the other hand, when the current AF state is not in rescanning, the flow proceeds to step S404. At step S404, the system controller 113 determines whether the focus speed SPD_CUR is the high speed. When the current focus speed SPD_CUR is the high speed, the flow proceeds step S405.

At step S405, the system controller 113 determines whether the focus speed SPD_PL is the medium speed. When the focus speed SPD_PL is the medium speed, the system controller 113 updates the current focus speed SPD_CUR to the medium speed at step S406.

On the other hand, when the focus speed SPD_PL is not the medium speed, the system controller 113 determines whether the focus speed SP_DPL is the low speed at step S407. When the focus speed SPD_PL is the low speed at step S407, the system controller 113 updates the current focus speed SPD_CUR to the low speed at step S408. On the other hand, when the focus speed SPD_PL is not the low speed (in a case of the high speed), the system controller 113 finishes the processing without updating the current focus speed SPD_CUR. As described above, when the current focus speed SPD_CUR is the high speed, the system controller 113 updates the current focus speed SPD_CUR according to the focus speed SPD_PL.

When the current focus speed SPD_CUR is not the high speed at step S404, the flow proceeds to step S409. At step S409, the system controller 113 determines whether the current focus speed SPD_CUR is the medium speed. When the current focus speed SPD_CUR is the medium speed at step S409, the flow proceeds to step S410.

At step S410, the system controller 113 determines whether the focus speed SPD_PL is the high speed. When the focus speed SPD_PL is the high speed, the flow proceeds to step 411 and increments (+1) the value of an acceleration counter. Then, at step S412, the system controller 113 determines whether the value of the acceleration counter is larger than an acceleration determination threshold (a predetermined value). When the value of the acceleration counter is larger than the acceleration determination threshold, the system controller 113 updates the current focus speed SPD_CUR to the high speed at step S413. Then, at step S414, the system controller 113 resets the acceleration counter.

When the focus speed SPD_PL is not the high speed at step S410, the system controller 113 resets the acceleration counter at step S415. Then, at step S416, the system controller 113 determines whether the focus speed SPD_PL is the low speed. When the focus speed SPD_PL is not the low speed (in a case of the medium speed) at step S416, the system controller 113 finishes the processing without updating the current focus speed SPD_CUR. On the other hand, when the focus speed SPD_PL is the low speed, the system controller 113 updates the current focus speed SPD_CUR to the low speed at step S417.

As described above, when the current focus speed SPD_CUR is the medium speed and slowed down from the medium speed to the low speed, the slowing is immediately performed according the focus speed SPD_PL. On the other hand, when the current focus speed SPD_CUR is accelerated from the medium speed to the high speed, the acceleration is performed after a state in which the focus speed SPD_PL is the high speed is continuously kept beyond a certain number of times.

On the other hand, when the current focus speed SPD_CUR is not the medium speed (in a case of the low speed) at step S409, the flow proceeds to step S418. At step S418, the system controller 113 determines whether the focus speed SPD_PL is the medium speed or the high speed. When the focus speed SPD_PL is not the medium speed or the high speed (in a case of the low speed), the system controller 113 resets the acceleration counter at step S423 and finishes the processing without updating the current focus speed SPD_CUR.

On the other hand, when the focus speed SPD_PL is the medium speed or the high speed, the flow proceeds to step S419 and increments (+1) the acceleration counter. At step S420, the system controller 113 determines whether the value of the acceleration counter is larger than the acceleration determination threshold. When the value of the acceleration counter is equal to or smaller than the acceleration determination threshold, the system controller 113 finishes the processing without updating the current focus speed SPD_CUR. On the other hand, when the value of the acceleration counter is larger than the acceleration determination threshold, the system controller 113 updates the current focus speed SPD_CUR to the medium speed at step S421. Then, at step S422, the system controller 113 resets the acceleration counter.

As described above, when the current focus speed SPD_CUR is the low speed, the acceleration is performed after a state in which the focus speed SPD_PL is the medium speed or the high speed is continuously kept beyond a certain number of times.

When the focus speed SPD_PL calculated at step S402 is lower than the current focus speed SPD_CUR, a deceleration counter may be incremented such that deceleration is performed when the value of the deceleration counter is larger than a deceleration determination threshold. In this case, the deceleration determination threshold is set to be smaller than the acceleration determination threshold.

(Calculation of the Degree of Focusing PL)

Figure 5:
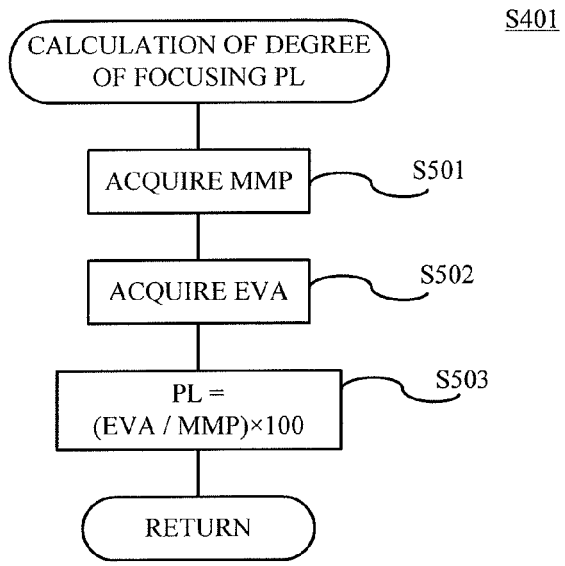
FIG. 5 is a flowchart illustrating a method of calculating a degree of focusing PL in each of the embodiments.

Next, referring to FIG. 5, the calculation of the degree of focusing PL in the present embodiment (step S401 in FIG. 4) will be described in detail. FIG. 5 is a flowchart illustrating a method of calculating the degree of focusing PL. The steps in FIG. 5 are each performed mainly by the system controller 113 (the AF processing unit 106).

First, at step S501, the system controller 113 (the AF processing unit 106) acquires a contrast value MMP within the ranging region set at step S301 in FIG. 3. The contrast value MMP within the ranging region is the difference between the maximum and minimum luminance values within the ranging region set at step S301. This allows determination of the contrast of an object within the ranging region even when the object is out of focus.

Subsequently, at step S502, the system controller 113 acquires a focus evaluation value EVA calculated at a certain frequency. Then, at step S503, the system controller 113 calculates the degree of focusing PL using the contrast value MMP and the focus evaluation value EVA. The degree of focusing PL is calculated using, for example, the following Expression (1).

$$PL=(EVA/MMP) \times 100 \qquad (1)$$

As described above, the degree of focusing PL is a ratio (%) of the contrast value MMP (the difference between the maximum and minimum luminance values within the ranging region) and the current focus evaluation value EVA (the focus evaluation value calculated at a certain frequency). The degree of blur of an object can be determined based on the degree of focusing PL. The present embodiment is not limited to this configuration, and the degree of focusing may be one of the gradient of the focus evaluation value and the rate of change in the gradient.

(Calculation of the Focus Speed SPD_PL)

Figure 6:
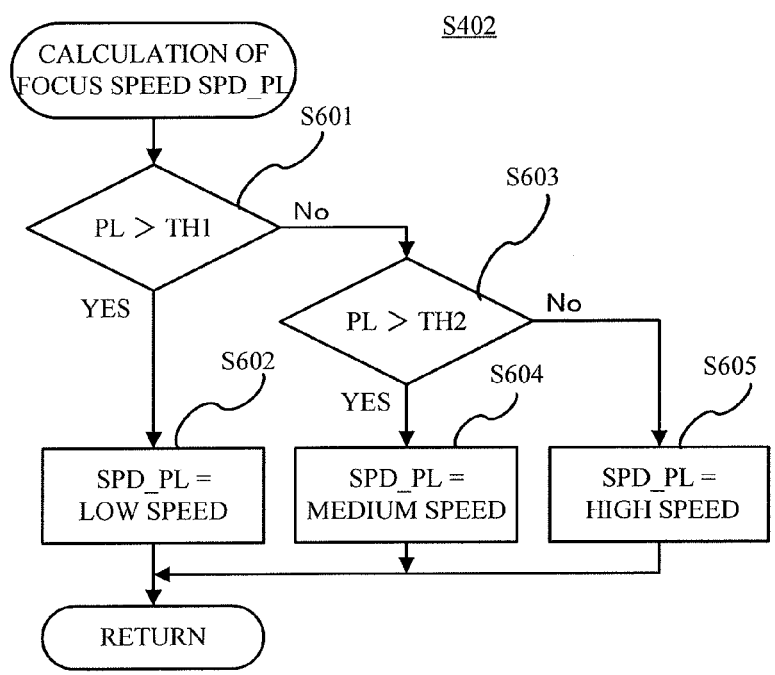
FIG. 6 is a flowchart illustrating a method of calculating a focus speed SPD_PL in each of the first and the third embodiments.

Next, referring to FIG. 6, the calculation of the focus speed SPD_PL in the present embodiment (step S402 in FIG. 4) will be described in detail. FIG. 6 is a flowchart illustrating a method of calculating the focus speed SPD_PL. The steps in FIG. 6 are each performed mainly by the system controller 113 (the AF processing unit 106).

First, at step S601, the system controller 113 determines whether the degree of focusing PL is larger than a threshold TH1. When the degree of focusing PL is larger than the threshold TH1, the flow proceeds to step S602 and the system controller 113 sets the focus speed SPD_PL to the low speed.

On the other hand, when the degree of focusing PL is equal to or smaller than the threshold TH1, the system controller 113 determines at step S603 whether the degree of focusing PL is larger than a threshold TH2 (<TH1). When the degree of focusing PL is larger than the threshold TH2, the flow proceeds to step S604 and the system controller 113 sets the focus speed SPD_PL to the medium speed. On the other hand, when the degree of focusing PL is equal to or smaller than the threshold TH2, the system controller 113 sets the focus speed SPD_PL to the high speed at step S605.

As described above, the AF processing unit 106 and the system controller 113 (the control unit) compares the degree of focusing PL and a first threshold (the threshold TH1, TH2). When the degree of focusing PL is larger than the first threshold, the AF processing unit 106 and the system controller 113 controls the focus speed to be small. In the present embodiment, such a configuration allows calculation of an appropriate focus speed SPD_PL according to the degree of focusing PL.

(Rescanning Determination)

Figure 12:
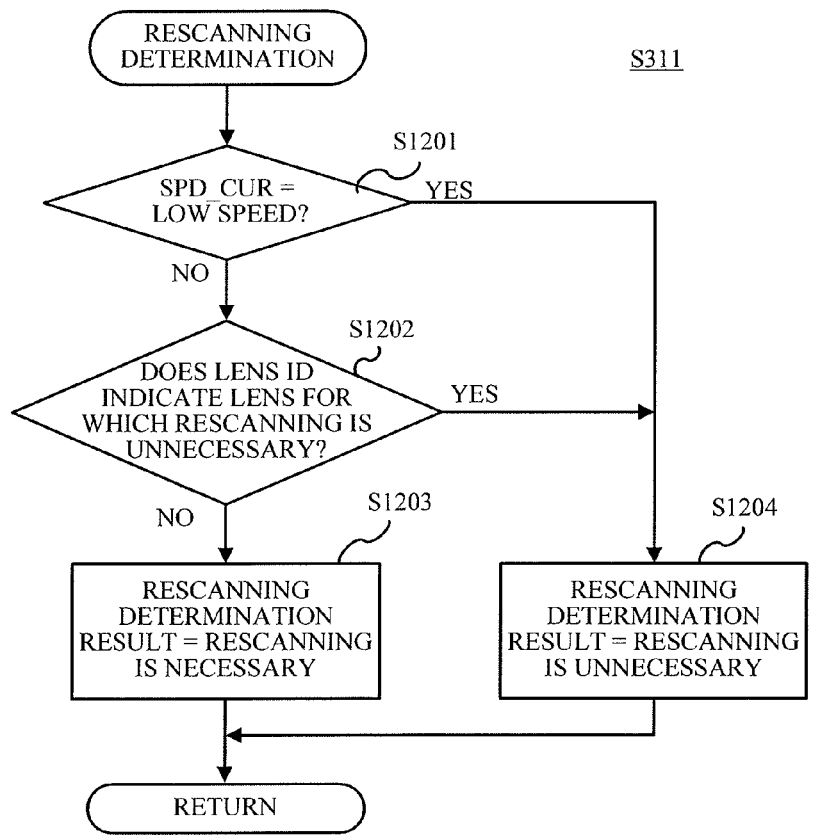
FIG. 12 is a flowchart illustrating a rescanning determination method using a lens ID in each of the embodiments.
Figure 13:
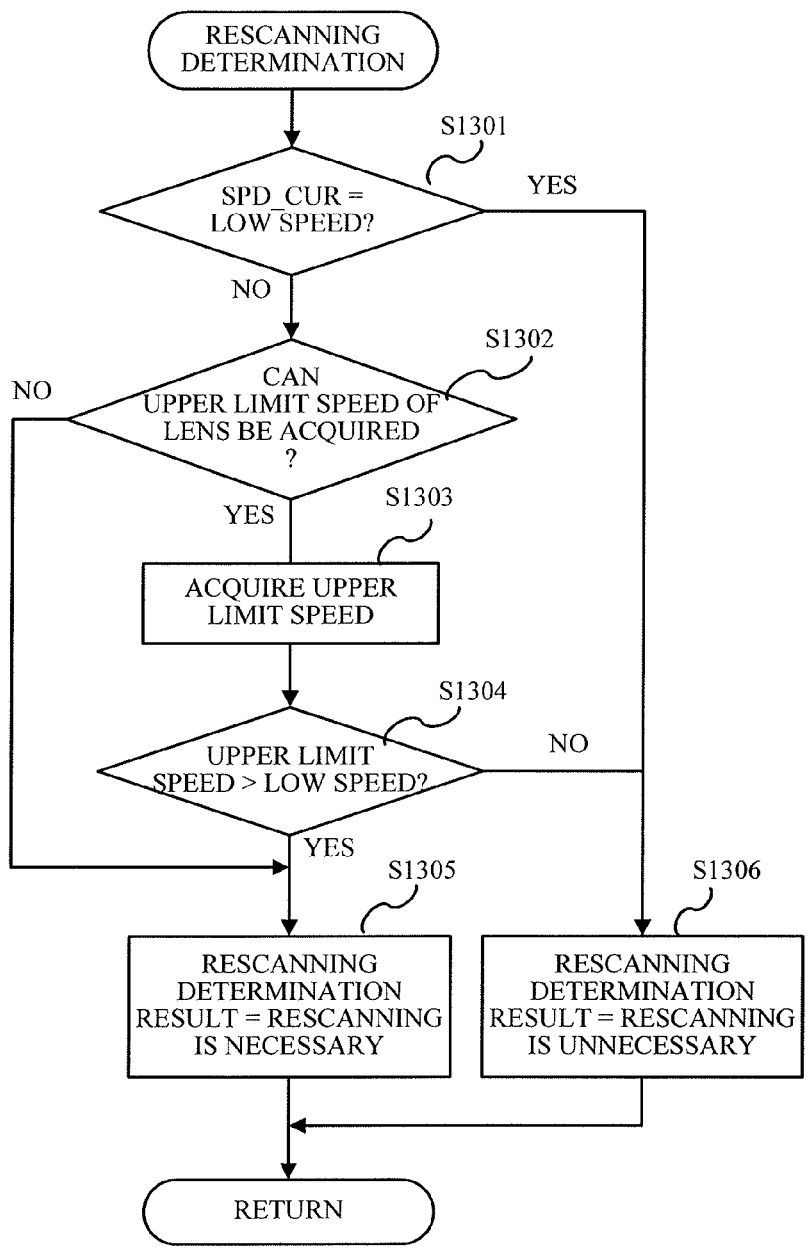
FIG. 13 is a flowchart illustrating a rescanning determination method using a lens upper limit speed in each of the embodiments.
Figure 14:
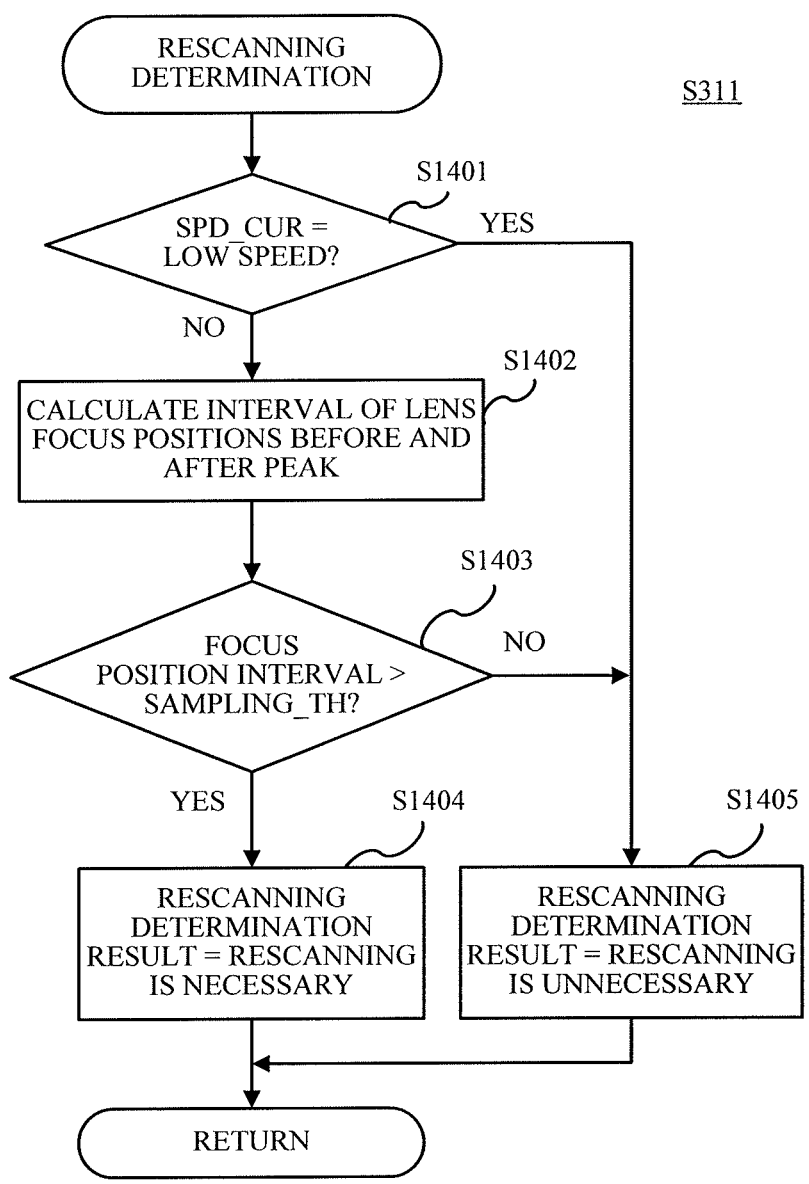
FIG. 14 is a flowchart illustrating a rescanning determination method using an interval of focus lens positions in each of the embodiments.

Next, referring to FIG. 12 to FIG. 14, the rescanning determination (step S311 in FIG. 3) in the present embodiment will be described in detail. Each of FIG. 12 to FIG. 14 is a flowchart illustrating a rescanning determination method in an image pickup apparatus to which a lens apparatus is detachable. The steps in FIG. 12 to FIG. 14 are each performed based on a command from the system controller 113. In the present embodiment, rescanning is to perform, after the peak value of the focus evaluation value is calculated based on the focus evaluation value obtained through a scanning operation of the focus lens and the position of the focus lens 104, another scanning operation again with its direction inverted.

First, referring to FIG. 12, a method of performing the rescanning determination using the lens identification number (lens ID) indicating the type of the lens apparatus will be described. To perform the rescanning determination using the lens identification number, it needs to be previously determined whether the focus lens is a lens that allows the in-focus accuracy to be reliably maintained even when a focus drive is performed at the fastest speed based on the upper limit of the drive speed.

First, at step S1201, the system controller 113 determines whether the focus speed SPD_CUR is the low speed at the in-focus determination. When the focus speed SPD_CUR is the low speed, the flow proceeds to step S1204 and the system controller 113 determines that rescanning is unnecessary. This is because the drive speed of the focus lens is set to the low speed and the in-focus accuracy is reliably maintainable.

On the other hand, when the focus speed SPD_CUR is not the low speed at step S1201, the flow proceeds to step S1202 and the system controller 113 determines whether the focus lens is a lens for which rescanning is unnecessary based on the lens ID (the lens identification number). When the focus lens is a lens for which rescanning is unnecessary, the flow proceeds to step S1204 and the system controller 113 determines that rescanning is unnecessary. On the other hand, when the focus lens is a lens for which rescanning is necessary, the flow proceeds to step S1203 and the system controller 113 determines that rescanning is necessary.

As described above, the system controller 113 is capable of performing the drive control of the focus lens 104 at the first focus speed (the low speed) or at a second focus speed (the high speed or the medium speed) higher than the first focus speed according to the degree of focusing calculated from the focus evaluation value. When the focus speed is the first the focus speed (the low speed), the system controller 113 does not perform recalculation (rescanning) of the peak position because a sufficient in-focus accuracy is obtained.

In the example illustrated in FIG. 12, the system controller 113 determines based on the lens ID whether rescanning is to be performed, when the focus speed is the second focus speed (the high speed or the medium speed). For example, the system controller 113 includes a storage unit that stores the relation between the lens ID and the upper limit speed of the focus lens 104. When determining based on the lens ID that the upper limit speed of the focus lens 104 is higher than a predetermined focus speed, the system controller 113 performs rescanning and recalculation of the peak position. On the other hand, when determining based on the lens ID that the upper limit speed of the focus lens 104 is equal to or lower than the predetermined focus speed, the system controller 113 does not perform rescanning.

Next, referring to FIG. 13, a method of performing the rescanning determination using the upper limit speed of the focus lens acquired from the lens apparatus will be described. Common descriptions with the processing in FIG. 12 will be omitted. First, at step S1301, the system controller 113 determines whether the focus speed SPD_CUR is the low speed at the in-focus determination. When the focus speed SPD_CUR is the low speed, the flow proceeds to step S1306 and the system controller 113 determines that rescanning is unnecessary.

On the other hand, when the focus speed SPD_CUR is not the low speed, the flow proceeds to step S1302. At step S1302, the system controller 113 determines whether the upper limit speed of the focus lens can be acquired. For example, the system controller 113 previously determines at initial communication with the lens apparatus whether the upper limit speed of the lens can be acquired through communication with the lens apparatus.

When the upper limit speed cannot be acquired at step S1302, the flow proceeds to step S1305 and the system controller 113 determines that rescanning is necessary. On the other hand, when the upper limit speed can be acquired, the flow proceeds to step S1303 and the system controller 113 acquires the upper limit speed through communication with the lens apparatus. Subsequently, at step S1304, the system controller 113 determines whether the acquired upper limit speed is higher than the focus speed at the low speed. When the upper limit speed is higher than the focus speed at the low speed, the flow proceeds to step S1305 and the system controller 113 determines that rescanning is necessary. On the other hand, when the upper limit speed is equal to or lower than the focus speed at the low speed, the flow proceeds to step S1306 and the system controller 113 determines that rescanning is unnecessary.

As described above, in the example illustrated in FIG. 13, the system controller 113 determines based on the upper limit speed of the focus lens 104 whether rescanning is to be performed, when the focus speed is the second focus speed (the high speed or the medium speed). More specifically, the system controller 113 performs rescanning and recalculation of the peak position when the upper limit speed of the focus lens 104 is higher than a predetermined focus speed. When the upper limit speed of the focus lens 104 is equal to or lower than the predetermined focus speed, the system controller 113 does not perform rescanning. The system controller 113 preferably determines whether the upper limit speed of the focus lens 104 can be acquired. When the upper limit speed can be acquired, the system controller 113 determines based on the acquired upper limit speed whether rescanning is to be performed. On the other hand, when the upper limit speed cannot be acquired, the system controller 113 performs rescanning and recalculation of the peak position.

Next, referring to FIG. 14, a method of performing the rescanning determination using the interval of the focus lens position acquired from the lens apparatus will be described. Common descriptions with the processing in FIG. 12 will be omitted. First, at step S1401, the system controller 113 determines whether the focus speed SPD_CUR is the low speed at the in-focus determination. When the focus speed SPD_CUR is the low speed, the flow proceeds to step S1405 and the system controller 113 determines that rescanning is unnecessary.

On the other hand, when the focus speed SPD_CUR is not the low speed, the flow proceeds to step S1402. At step S1402, the system controller 113 calculates the interval of the focus position before and after the peak. The interval of the focus position is the difference in the focus lens position when the focus evaluation value and the position of the focus lens are associated before and after the peak. Typically, a smaller difference in the focus position leads to an improved in-focus accuracy.

Subsequently, at step S1403, the system controller 113 determines whether the interval of the focus position is larger than a threshold SAMPLING_TH. The threshold SAMPLING_TH is previously set as an interval to reliably maintain the in-focus accuracy. When the interval of the focus position is larger than the threshold SAMPLING_TH, the flow proceeds to step S1404 and the system controller 113 determines that rescanning is necessary. On the other hand, when the interval of the focus position is equal to or smaller than the threshold SAMPLING_TH, the flow proceeds to step S1405 and the system controller 113 determines that rescanning is unnecessary.

As described above, in the example illustrated in FIG. 14, the system controller 113 determines based on the interval of the position of the focus lens 104 before and after the peak position whether rescanning is to be performed, when the focus speed is the second focus speed (the high speed or the medium speed). More specifically, the system controller 113 determines whether the interval of the position of the focus lens 104 is larger than the predetermined value (the threshold SAMPLING_TH). When the interval is larger than the predetermined value, the system controller 113 performs rescanning and recalculation of the peak position. On the other hand, when the interval is equal to or smaller than the predetermined value, the system controller 113 does not perform rescanning.

In the example illustrated in FIG. 13, when the upper limit speed of the focus lens cannot be acquired at step S1302, the processing at step S1402 and the following steps in FIG. 14 may be performed. That is, when the upper limit speed of the focus lens cannot be acquired, whether rescanning is necessary may be determined based on comparison between the interval of the focus position and the threshold SAMPLING_TH by calculating the interval of the focus position before and after the peak. This can prevents unnecessary rescanning even with a lens apparatus in which the upper limit speed of the focus lens cannot be acquired.

As described above, the system controller 113 (the control unit) is capable of performing the rescanning determination after the focus lens 104 is stopped driving. When the focus speed at the in-focus determination is lower than a predetermined speed (is the first focus speed), the system controller 113 determines that rescanning is unnecessary.

As described above, in the present embodiment, the system controller 113 (the control unit) calculates the peak position of the focus evaluation value, based on the focus evaluation value and the position of the focus lens 104. After that, the system controller 113 determines whether rescanning is to be performed. When rescanning is to be performed, the system controller 113 inverts the drive direction of the focus lens 104 to perform scanning operation and calculate the peak position after recalculation. On the other hand, when rescanning is not to be performed, the system controller 113 performs a drive control of the focus lens 104 to an already calculated peak position. In the present embodiment, this can effectively prevent unnecessary rescanning, thereby allowing an improved focusing speed.

Second Embodiment

Next, a second embodiment of the present invention will be described. In the present embodiment, the method of calculating the focus speed SPD_PL differs from that in the first embodiment, and other configurations are the same as with the first embodiment and their description will be omitted. The rescanning determination method described in the first embodiment is also applicable in the present embodiment.
(Calculation of the Focus Speed SPD_PL)

Figure 7:
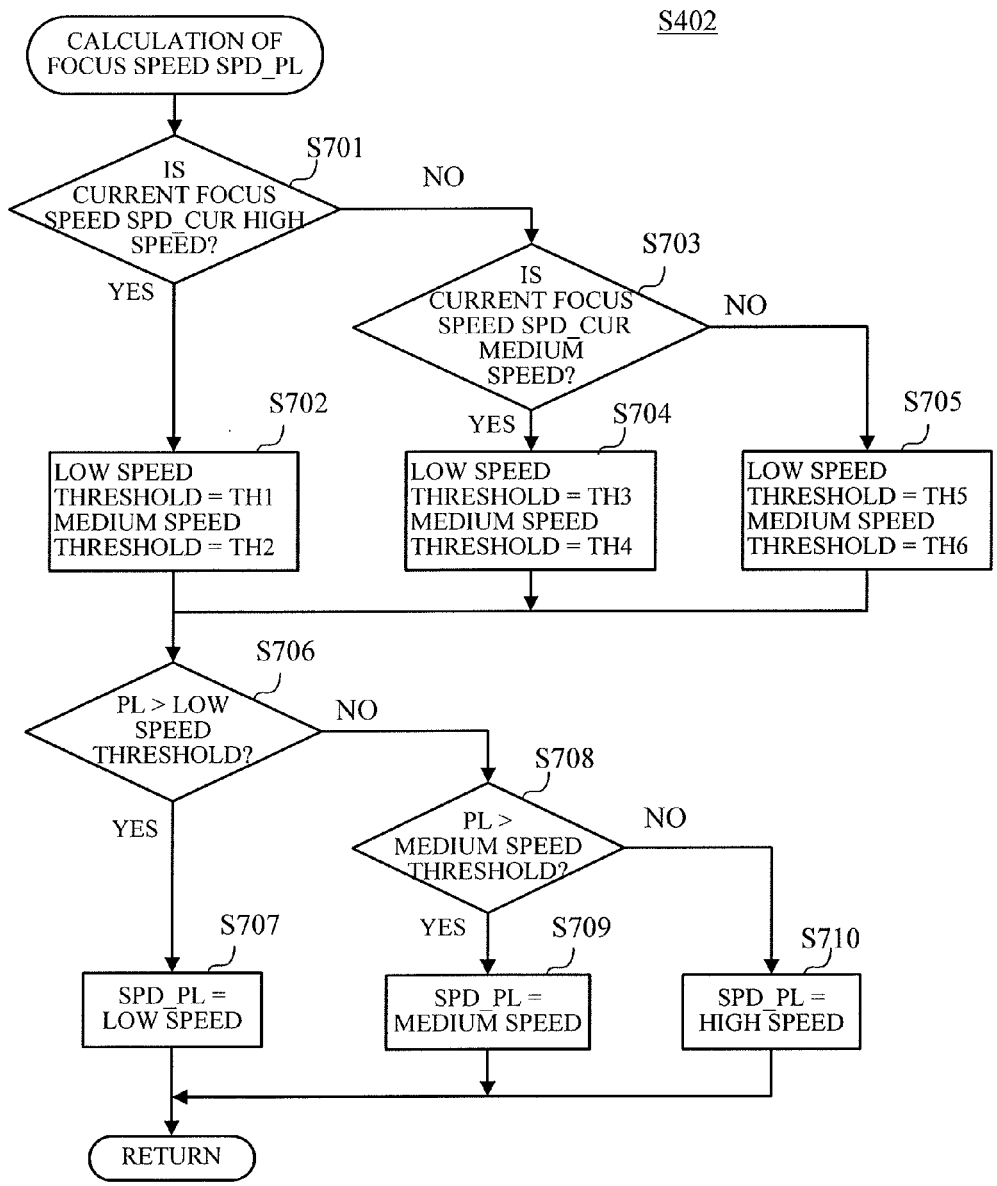
FIG. 7 is a flowchart illustrating a method of calculating a focus speed SPD_PL in the second embodiment.

Referring to FIG. 7, the calculation of the focus speed SPD_PL (step S402 in FIG. 4) in the present embodiment will be described in detail. FIG. 7 is a flowchart illustrating the method of calculating the focus speed SPD_PL. The steps in FIG. 7 are each performed mainly by the system controller 113 (the AF processing unit 106).

First, at step S701, the system controller 113 determines whether the current focus speed SPD_CUR is the high speed.

When the current focus speed SPD_CUR is the high speed, the flow proceeds to step S702. At step S702, the system controller 113 sets the threshold TH1 as the low speed threshold and the threshold TH2 (<TH1) as the medium speed threshold. In the present embodiment, when the degree of focusing PL is larger than the low speed threshold, the focus speed SPD_PL is set to the low speed. When the degree of focusing PL is equal to or smaller than the low speed threshold and is larger than the medium speed threshold, the focus speed SPD_PL is set to the medium speed. When the degree of focusing PL is equal to or smaller than the medium speed threshold, the focus speed SPD_PL is set to the high speed.

On the other hand, when the current focus speed SPD_CUR is not the high speed at step S701, the flow proceeds to step S703. At step S703, the system controller 113 determines whether the current focus speed SPD_CUR is the medium speed. When the current focus speed SPD_CUR is the medium speed, the flow proceeds to step S704. At step 3704, the system controller 113 sets a threshold TH3 as the low speed threshold and a threshold TH4 (<TH3) as the medium speed threshold. On the other hand, when the current focus speed SPD_CUR is not the medium speed at step S703, that is, the current focus speed SPD_CUR is the low speed, the flow proceeds to step S705. At step S705, the system controller 113 sets a threshold TH5 as the low speed threshold and a threshold TH6 (<TH5) as the medium speed threshold.

Subsequently, at step S706, the system controller 113 determines whether the degree of focusing PL is larger than the low speed threshold (one of the thresholds TH1, TH3, and TH5) set according to the current focus speed SPD_CUR. When the degree of focusing PL is larger than the low speed threshold, the flow proceeds to step S707 and the system controller 113 sets the focus speed SPD_PL to the low speed.

On the other hand, when the degree of focusing PL is equal to or smaller than the low speed threshold, the flow proceeds to step S708. At step S708, the system controller 113 determines whether the degree of focusing PL is larger than the medium speed threshold (one of the thresholds TH2, TH4, and TH6) set according to the current focus speed SPD_CUR. When the degree of focusing PL is larger than the medium speed threshold, the system controller 113 sets the focus speed SPD_PL to the medium speed at step S709. On the other hand, when the degree of focusing PL is equal to or smaller than the medium speed threshold, the system controller 113 sets the focus speed SPD_PL to the high speed at step S710.

Figure 8:
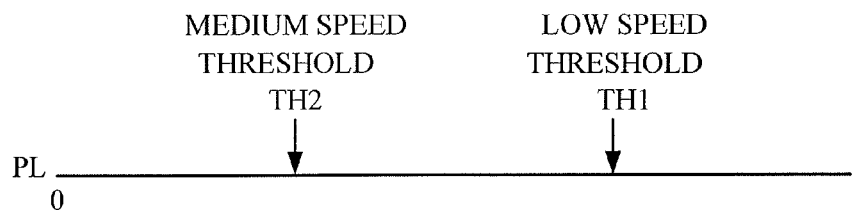
FIG. 8 is a relational diagram of the current focus speed SPD_CUR, and a low speed and a medium speed threshold in the second embodiment.
Figure 8:
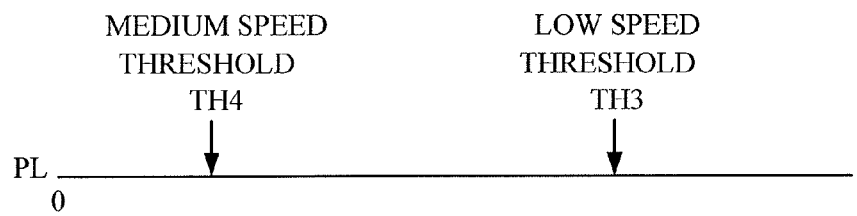
Figure 8:
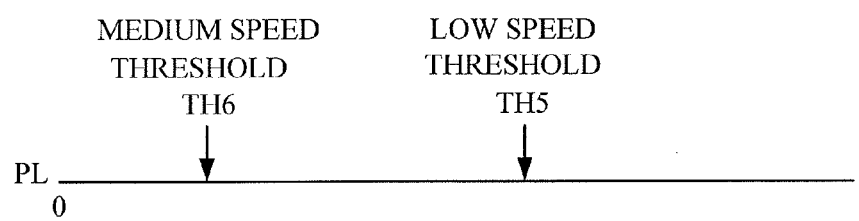

Subsequently, referring to FIG. 8, the relation between the current focus speed SPD_CUR, and the low speed threshold and the medium speed threshold will be described. FIG. 8 is a diagram illustrating an example of the relation between the current focus speed SPD_CUR, and the low speed threshold and the medium speed threshold. The medium speed threshold is smaller (TH2>TH4) when the current focus speed SPD_CUR is the medium speed (FIG. 8 (ii)) than when the current focus speed SPD_CUR is the high speed (FIG. 8 (i)). Thus, the degree of focusing PL is smaller (more blurred) when SPD_PL is set to the high speed while the current focus speed SPD_CUR is the medium speed, than when SPD_PL is set to the medium speed while the current focus speed SPD_CUR is the high speed. Similarly, the low speed threshold is smaller when the current focus speed SPD_CUR is the low speed (FIG. 8 (iii)) than when the current focus speed SPD_CUR is the medium speed (FIG. 8 (ii)). Thus, the degree of focusing PL is smaller (more blurred) when SPD_PL is set to the medium speed while the current focus speed SPD_CUR is the low speed, than when SPD_PL is set to the low speed while the current focus speed SPD_CUR is the medium speed.

As described above, the system controller 113 (the control unit) sets a first threshold to be smaller than a second threshold. The first threshold is a threshold when the focus speed is set to a higher second speed while the current focus speed is a first speed. The second threshold is a threshold when the focus speed is set to the first speed while the current focus speed is a second speed. That is, each of the thresholds TH1 to TH6 is set to satisfy the relations of TH5<TH1, TH5<TH3, TH4<TH2, and TH6<TH2. In the present embodiment, the threshold for acceleration differs from the threshold for deceleration, and is set to be smaller than the threshold for deceleration, thereby allowing acceleration under more appropriate conditions.

Third Embodiment

Next, a third embodiment of the present invention will be described. In the present embodiment, the method of setting the focus speed (step S303 in FIG. 3) differs from that in the first embodiment, and other configurations are the same as with the first embodiment and their description will be omitted. The rescanning determination method described in the first embodiment is also applicable in the present embodiment.

In the present embodiment, the image pickup element 107 includes an image pickup pixel and a focus detection pixel and is configured to perform focus detection by a phase difference method using an output from the focus detection pixel. More specifically, the focus detection is performed by calculating the amount of defocus based on a phase difference between a pair of image signals generated upon receiving light beams passing through different pupil regions. The present embodiment describes a case in which, with such a configuration, a fast AF operation is performed by the phase difference method in combination with the contrast method. The present embodiment is, however, not limited to this configuration, and may include a phase difference detection element disposed outside the image pickup element 107.

(Setting of the Focus Speed)

Figure 9:
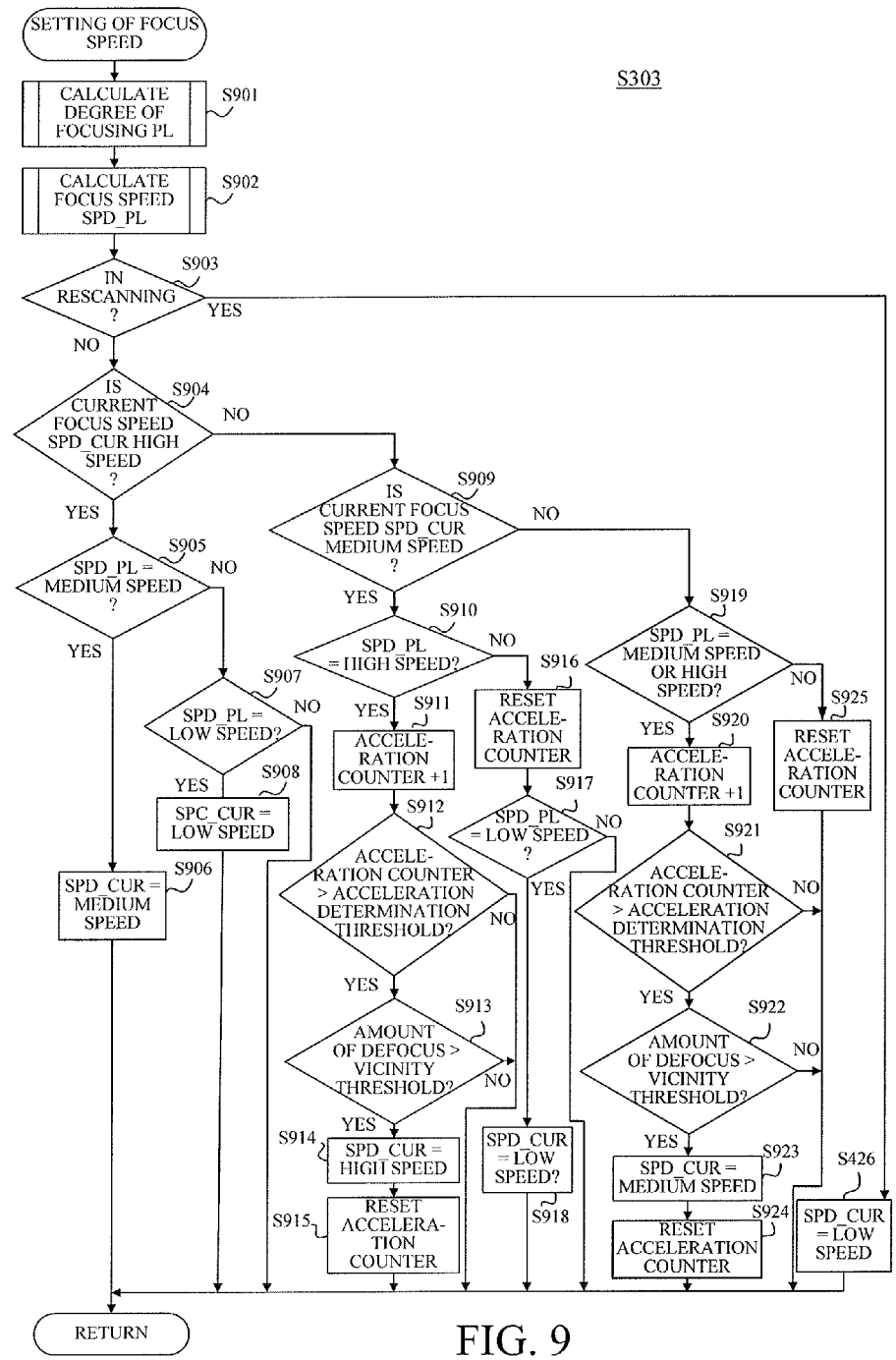
FIG. 9 is a flowchart illustrating a method of setting a focus speed SPD_CUR in the third embodiment.

Referring to FIG. 9, the setting of the focus speed at step S303 in FIG. 3 will be described in detail. FIG. 9 is a flowchart illustrating a method of setting the focus speed in the present embodiment. The steps in FIG. 9 are each performed mainly by the system controller 113 and the AF processing unit 106. The flowchart in FIG. 9 differs from that in FIG. 4 in that it has additional steps S913 and S922. Steps S901 to S912, S914 to S921, and S923 to S926 in FIG. 9 are the same as steps S401 to S424 in FIG. 4, respectively, and their descriptions will be thus omitted.

At step S913, the system controller 113 determines whether the amount of defocus acquired from the phase difference AF detection unit 124 (obtained by phase difference detection) is larger than a threshold (vicinity threshold) indicating an in-focus vicinity position. When the amount of defocus is larger than the vicinity threshold, the system controller 113 permits acceleration and sets the current focus speed SPD_CUR to the high speed. On the other hand, when the amount of defocus is equal to or smaller than the vicinity threshold, it is possible that the degree of focusing PL is small because of a low luminance or the like even at the in-focus vicinity position. In this case, performing the acceleration is undesirable and thus the current focus speed SPD_CUR is not changed.

Similarly, at step S922, the system controller 113 determines whether the amount of defocus acquired from the phase difference AF detection unit 124 (obtained by phase difference detection) is larger than the threshold (the vicinity threshold) indicating the in-focus vicinity position. When the amount of defocus is larger than the vicinity threshold, the system controller 113 permits acceleration and sets the current focus speed SPD_CUR to the medium speed. On the other hand, when the amount of defocus is equal to or smaller than the vicinity threshold, performing the acceleration is undesirable and thus the current focus speed SPD_CUR is not changed.

As described above, the system controller 113 (the control unit) determines whether the amount of defocus obtained by focus detection by the phase difference method is larger than the vicinity threshold. When the amount of defocus is larger than the vicinity threshold, the system controller 113 accelerates the focus speed. According to the present embodiment, the acceleration is controlled to be performed only when the amount of defocus obtained by the phase difference detection is large, which more effectively prevents erroneous acceleration.

Fourth Embodiment

Next, a fourth embodiment of the present invention will be described. In the present embodiment, the method of calculating the focus speed SPD_PL differs from that in the first embodiment and the other configurations are the same as in the first embodiment, and thus their descriptions will be omitted. The rescanning determination method described in the first embodiment is also applicable in the present embodiment.

Typically, a closer focus position leads to a larger amount of focus change (amount of movement of an imaging plane) per amount of focus movement. In the present embodiment, the thresholds for acceleration and deceleration are changed according to the focus position of the lens.
(Calculation of the Focus Speed SPD_PL)

Figure 10:
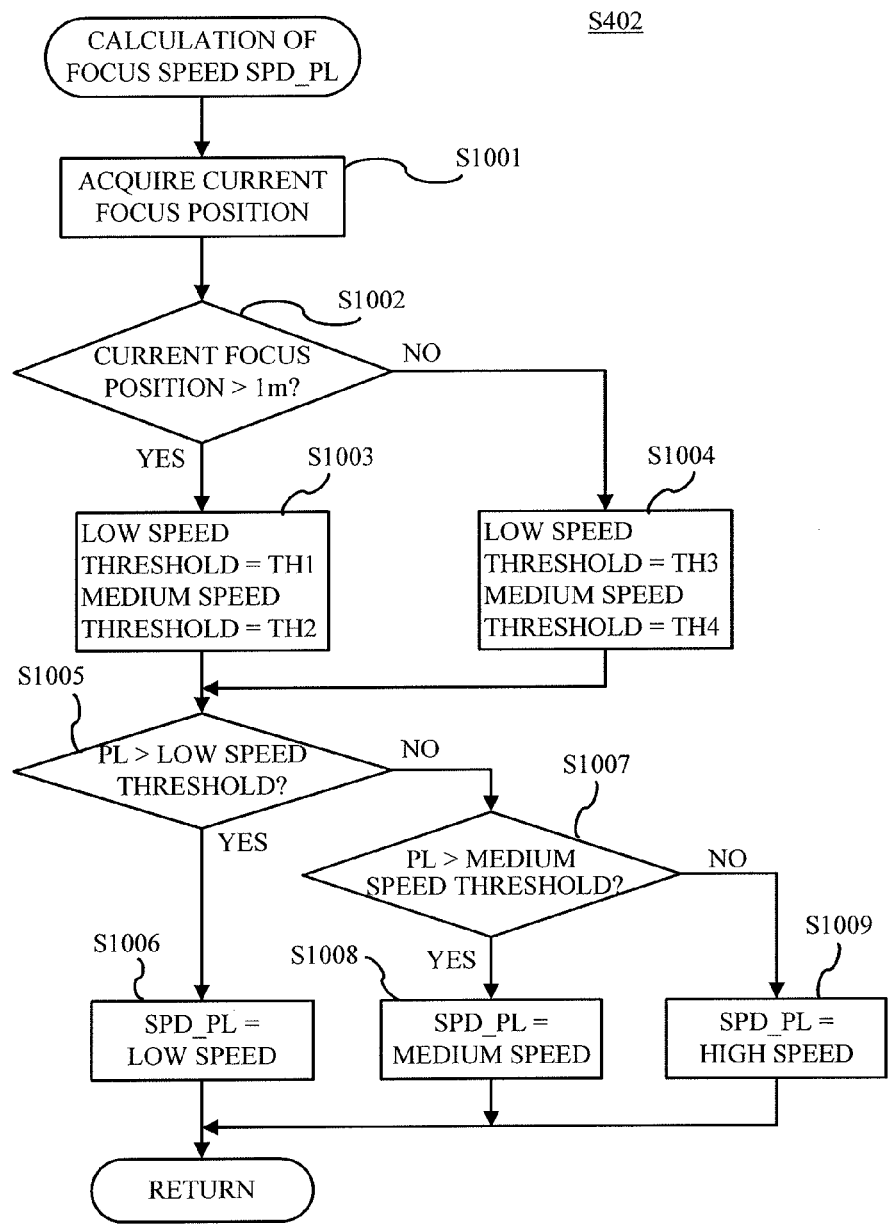
FIG. 10 is a flowchart illustrating a method of calculating a focus speed SPD_PL in the fourth embodiment.

Referring to FIG. 10, the calculation of the focus speed SPD_PL (step S402 in FIG. 4) in the present embodiment will be described in detail. FIG. 10 a flowchart illustrating a method of calculating the focus speed SPD_PL. The steps in FIG. 10 are each performed mainly by the system controller 113 (the AF processing unit 106).

First, at step S1001, the system controller 113 acquires the current focus position from the focus position detection unit 123. Subsequently, at step S1002, the system controller 113 determines whether the in-focus distance corresponding to the current focus position is larger than 1 meter. The distance (the focus position) used for this determination is not limited to 1 meter but may be set to an arbitrary distance. When the in-focus distance corresponding to the current focus position is larger than 1 meter, the flow proceeds to step S1003. At step S1003, the system controller 113 sets the threshold TH1 as the low speed threshold and the threshold TH2 (<TH1) as the medium speed threshold. On the other hand, when the in-focus distance corresponding to the current focus position is equal to or smaller than 1 meter, the flow proceeds to step S1004. At step S1004, the system controller 113 sets the threshold TH3 as the low speed threshold and the threshold TH4 (<TH3) as the medium speed threshold.

Subsequently, at step S1005, the system controller 113 determines whether the degree of focusing PL is larger than the low speed threshold set according to the current focus position. When the degree of focusing PL is larger than the low speed threshold, the flow proceeds to step S1006. At step S1006, the system controller 113 sets the focus speed SPD_PL to the low speed. On the other hand, when the degree of focusing PL is equal to or smaller than the low speed threshold, the flow proceeds to step S1007. At step S1007, the system controller 113 determines whether the degree of focusing PL is larger than the medium speed threshold set according to the current focus position. When the degree of focusing PL is larger than the medium speed threshold, the flow proceeds to step S1008. At step S1008, the system controller 113 sets the focus speed SPD_PL to the medium speed. On the other hand, when the degree of focusing PL is equal to or smaller than the medium speed threshold, the flow proceeds to step S1009. At step S1009, the system controller 113 sets the focus speed SPD_PL to the high speed.

Figure 11:
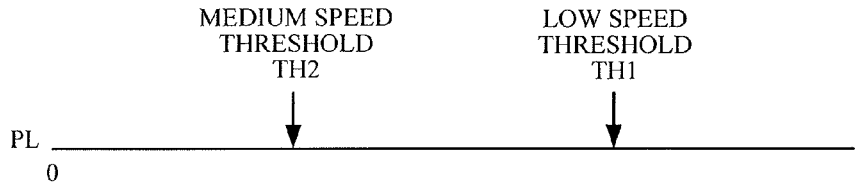
FIG. 11 is a relational diagram of a focus position, and a low speed and a medium speed threshold in the fourth embodiment.
Figure 11:
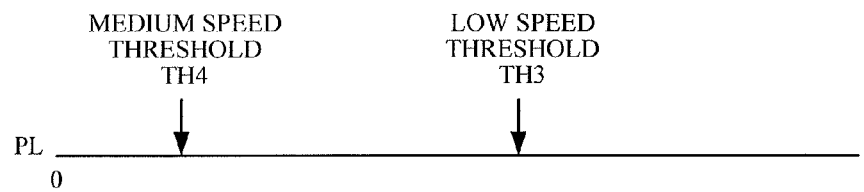

Subsequently, referring to FIG. 11, the relation between the focus position, and the low speed threshold and the medium speed threshold will be described. FIG. 11 is a relational diagram of the focus position, and the low speed threshold and the medium speed threshold. When the in-focus distance corresponding to the focus position is equal to or smaller than 1 meter (FIG. 11 (ii)), the medium speed threshold and the low speed threshold are smaller than those when the in-focus distance corresponding to the focus position is larger than 1 meter (FIG. 11 (i)). Thus, when the focus lens is on the close side while the focus lens is moved toward the in-focus position (the focus evaluation value increases), SPD_PL is set to be lower than the current speed in a more blurred state. That is, conditions encouraging deceleration are set. On the other hand, when the focus lens is on the close side while the focus lens is moved beyond the in-focus position (the focus evaluation value decreases), SPD_PL is set to be faster than the current speed in a more blurred state. That is, conditions discouraging acceleration are set.

In the present embodiment, the thresholds for setting the speed vary according to the focus position. By setting the thresholds to be smaller when the in-focus distance corresponding to the focus position is small (the lens is on the close side), a state in which deceleration is encouraged and acceleration is discouraged is achieved.

As described above, the AF processing unit 106 and the system controller 113 (the control unit) change the first threshold according to the position (the focus position) of the focus lens 104. In the present embodiment, when the focus position is on the close side where the amount of movement of the imaging plane is large, deceleration is encouraged and acceleration is discouraged, which allows a more highly accurate AF. In the present embodiment, the focus lens speed is adjusted with the three speeds of the low speed, the medium speed, and the high speed, but the focus speed may be further finely adjusted.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As described above, in each of the embodiments, the peak position of the focus evaluation value is calculated with the drive speed of the focus lens being variable, and the conditions of decelerating and accelerating the focus lens are set to be different from each other. This allows a highly accurate and fast focus detection (AF) independently of an object or setting of a camera. In each of the embodiments, an image pickup apparatus, an image pickup system, a method of controlling the image pickup apparatus, and a non-transitory computer-readable storage medium that are capable of performing a highly accurate and fast focus detection can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and the functions.

This application claims the benefit of Japanese Patent Application No. 2013-106387, filed on May 20, 2013, which is hereby incorporated by reference herein in its entirety.

What is claimed is:

1. An image pickup apparatus to which a lens unit including an image pickup optical system including a focus lens is attachable, the image pickup apparatus comprising:
an image pickup element configured to perform photoelectric conversion on light passing through the image pickup optical system of the attached lens unit to generate an image pickup signal;
a control unit configured to control drive of the focus lens based on a focus signal generated from the image pickup signal; and
an acquisition unit configured to acquire type information of the lens unit,
wherein the control unit is configured to:
perform a first scanning operation of driving the focus lens in a first direction and perform a second scanning operation of driving the focus lens at a lower speed than a predetermined speed in a second direction different from the first direction after the first scanning operation, and
determine whether to perform the second scanning operation based on the type information of the lens unit in a case where a drive speed of the focus lens when an in-focus position is detected based on the focus signal acquired during the first scanning operation is higher than the predetermined speed,
wherein when the acquisition unit acquires the type information corresponding to a lens unit which is previously determined to have a high in-focus accuracy for the focus lens driven at an upper limit speed, the control unit controls not to perform the second scanning operation.

2. The image pickup apparatus according to claim 1, wherein the control unit controls not to perform the second scanning operation in a case where the drive speed of the focus lens when the in-focus position is detected based on the focus signal acquired during the first scanning operation is lower than the predetermined speed.

3. The image pickup apparatus according to claim 1, wherein the control unit is capable of changing the drive speed of the focus lens based on the focus signal during the first scanning operation.

4. The image pickup apparatus according to claim 3, wherein the control unit is capable of determining a degree of focusing based on the focus signal and changes the drive speed of the focus lens based on the degree of focusing during the first scanning operation.

5. The image pickup apparatus according to claim 4, wherein the control unit sets the drive speed of the focus lens to be lower as the degree of focusing is higher.

6. The image pickup apparatus according to claim 4, wherein the degree of focusing indicates one of a gradient of the focus signal and a rate of change in the gradient.

7. A method of controlling an image pickup apparatus to which a lens unit including an image pickup optical system including a focus lens is attachable, the image pickup apparatus including an image pickup unit configured to perform photoelectric conversion on light passing through the image pickup optical system to generate an image pickup signal, the method comprising the steps of:
performing a first scanning operation of driving the focus lens in a first direction;
performing a second scanning operation of driving the focus lens at a lower speed than a predetermined speed in a second direction different from the first direction after the first scanning operation;
controlling drive of the focus lens based on a focus signal generated from the image pickup signal; and
acquiring type information of the lens unit,
wherein, in a case where a drive speed of the focus lens when an in-focus position is detected based on the focus signal acquired during the first scanning operation is higher than the predetermined speed, it is determined based on the type information of the lens unit whether the second scanning operation is to be performed,
wherein when the type information corresponds to a lens unit which is previously determined to have a high in-focus accuracy for the focus lens driven at an upper limit speed, it is determined not to perform the second scanning operation.

8. A non-transitory computer-readable storage medium that stores a control program configured to cause a computer to execute the method of controlling the image pickup apparatus according to claim 7.

9. An image pickup apparatus to which a lens unit including an image pickup optical system including a focus lens is attachable, the image pickup apparatus comprising:
an image pickup element configured to perform photoelectric conversion on light passing through the image pickup optical system of the attached lens unit to generate an image pickup signal;
a controller configured to:
control drive of the focus lens based on a focus signal generated from the image pickup signal, and
acquire type information of the lens unit,
wherein the controller is further configured to:
perform a first scanning operation of driving the focus lens in a first direction and perform a second scanning operation of driving the focus lens at a lower speed than a predetermined speed in a second direction different from the first direction after the first scanning operation, and
determine whether to perform the second scanning operation based on the type information of the lens unit in a case where a drive speed of the focus lens when an in-focus position is detected based on the focus signal acquired during the first scanning operation is higher than the predetermined speed, wherein when the controller acquires the type information corresponding to a lens unit which is previously determined to have a high in-focus accuracy for the focus lens driven at an upper limit speed, the controller controls not to perform the second scanning operation.

10. The image pickup apparatus according to claim 9, wherein the controller controls not to perform the second scanning operation in a case where the drive speed of the focus lens when the in-focus position is detected based on the focus signal acquired during the first scanning operation is lower than the predetermined speed.

11. The image pickup apparatus according to claim 9, wherein the controller is capable of changing the drive speed of the focus lens based on the focus signal during the first scanning operation.

12. The image pickup apparatus according to claim 11, wherein the controller is capable of determining a degree of focusing based on the focus signal and changes the drive speed of the focus lens based on the degree of focusing during the first scanning operation.

13. The image pickup apparatus according to claim 12, wherein the controller sets the drive speed of the focus lens to be lower as the degree of focusing is higher.

14. The image pickup apparatus according to claim 12, wherein the degree of focusing indicates one of a gradient of the focus signal and a rate of change in the gradient.

* * * * *